United States Patent [19]

Terashita

[11] Patent Number: 5,233,386
[45] Date of Patent: Aug. 3, 1993

[54] PHOTOSENSITIVE MATERIAL FOR MANAGING CONDITION, METHOD OF MANAGING CONDITION AND APPARATUS FOR PROCESSING A PHOTOSENSITIVE MATERIAL

[75] Inventor: Takaaki Terashita, Kanagawa, Japan

[73] Assignee: Fuji Photo Film Co., Ltd., Kanagawa, Japan

[21] Appl. No.: 765,743

[22] Filed: Sep. 26, 1991

[30] Foreign Application Priority Data

Oct. 1, 1990 [JP] Japan .................................. 2-263606
Oct. 5, 1990 [JP] Japan .................................. 2-267822

[51] Int. Cl.[5] .................................................. G03B 27/52
[52] U.S. Cl. ........................................ 355/41; 355/27; 355/50
[58] Field of Search ...................... 355/41, 27, 28, 50; 354/109

[56] References Cited

U.S. PATENT DOCUMENTS 5,029,313 7/1991 Robison et al. ................. 355/27 X Primary Examiner—Richard A. Wintercorn
Attorney, Agent, or Firm—Sughrue, Mion, Zinn, Macpeak & Seas

[57] ABSTRACT

A photosensitive material for managing condition according to the present invention is provided with a data recording portion on which condition managing data is recorded. Therefore, it becomes possible to readily make the photosensitive material and this condition managing data correspond. In addition, an apparatus for processing the photosensitive material includes a photometric unit for photometrically measuring the image of the photosensitive material, a read unit for reading data on the data recording portion and a managing unit for conducting a condition management with the photometric value and the read data. In consequence, the condition management becomes easy.

19 Claims, 11 Drawing Sheets

PHOTOSENSITIVE MATERIAL FOR MANAGING CONDITION, METHOD OF MANAGING CONDITION AND APPARATUS FOR PROCESSING A PHOTOSENSITIVE MATERIAL

BACKGROUND OF THE INVENTION a) Field of the Invention

The present invention relates to a photosensitive material used for managing processing conditions, a method of managing processing conditions by using this photosensitive material and an apparatus for processing the photosensitive material for carrying out the processing condition management.

b) Description of the Related Art

In a general developing station, a negative film is developed by a film processor and the image of a resulting film is printed onto paper by means of a color printer, and the printed paper is developed by means of a color processor to obtain a print from the photographed film. In recent years, a printer processor, in which a printer and a paper processor are combined, has been widely used, and its operation is carried out in a manner similar to the above-described apparatus. When used over a long period of time, a developing solution cannot hold its normal performance due to the excess and/or lack of replenishing solution, oxidization by air, inclusion of the solution used in the preceding process. Therefore, in order to keep the print quality constantly excellent, it is necessary to constantly manage the developing solution of the film processor and the developing solution of the paper processor. Therefore, conventionally, a film developing control strip, which is prepared in advance on a film by exposing under a plurality of conditions, is passed through a film processor while a control strip for evaluating developing performance of paper, which is also prepared in advance on paper by exposing under a plurality of conditions, is passed through a paper processor, so that the developed film or print is measured in density to manage the processing conditions such as in developing or the like.

In addition, in order to provide consistent, high-quality color printing by the printer and processor, it is necessary to manage the developing solution for correct developing and to properly set a standard exposure condition of the printer to the apparatus. Although, to this end, the standard exposure condition is set at the time the printer is installed, when color paper having different emulsion numbers is used, or when it is desirable to change an exposure lamp of the exposure portion, or the developing solution is to be exchanged, or as at the turning point of the season, the content of the picture is changed from the colorful to the less colorful or vice versa, since the printing condition is also changed, it is necessary to modify and reset this standard exposure condition.

In addition, since the printing condition is also changed due to the contamination or deterioration of a light source system including a dimmer filter, halogen lamp, reflector and the like or the replacement conditioned thereby, it is necessary to modify the standard exposure condition and reset it in a manner similar to the foregoing. When the standard exposure condition is modified, a reference negative film provided with a portion corresponding to the average object color about a portion corresponding to the negative which photographed a gray object is used, and the density of a test print printed and developed from this reference negative film and the density of a previously printed and developed reference print (target density) are compared for modification.

However, the workmanship of the control strip differs depending on the kind of the photosensitive material used as the control strip, and also on the degree of the seasonal aging. Therefore, it is desirable to carry out the management of conditions by taking into account the kind of the photosensitive material or degree of seasonal deterioration although, in this case, it has been necessary to carry it out by applying the correction data for managing the conditions which take into account the characteristic change or the like of the photosensitive material for each of the control strip and matching the control strip with the above-described data for managing the conditions, which has in turn made the work complicated.

In addition, in order to provide consistent, high-quality color printing, it is necessary to properly set the copying condition of the printer, that is, the exposure condition to the apparatus. Although, to this end, a standard exposure condition is set at the time the printer is installed and an appropriate exposure condition (copying condition) is achieved based on this standard exposure condition, when a color paper having different emulsions is used or an exposure lamp of the exposure portion is exchanged or the developing solution is exchanged or the content of the photograph is changed from the colorful one to the less colorful one, or vice versa at the turning point of the season, since the printing condition is changed, it is necessary to modify and reset the above-described exposure condition. In addition, since the printing condition is changed by the contamination or deterioration of the light source including the dimmer filter, halogen lamp or reflector or the like or its replacement conditioned thereby, it is necessary to modify and reset the standard exposure condition as in the foregoing. When the standard exposure condition is modified, a film for setting the copying condition, such as the standard negative film or the like, is used. For example, for the standard negative film, a plurality of images for setting the exposure condition, which is provided with a portion corresponding to the average object color, is recorded about the portion corresponding to the negative film which photographed a gray object, depending on the exposure, and the image density of the previously printed and developed test print and the image density of the reference print (target density) are compared with each other to correct, set and manage the exposure condition (copying condition).

This correction principle is explained according to a most simplified exposure operational formula. This exposure operational formula becomes as shown in the following expression (1) (where: c, m and y represent three primaries according to the subtractive method), $$Dco = Cc (Dc - Dnc) + Kc\ Ic + Kd\ Id + Bpc + Bnc \quad (1)$$
$$Dmo = Cm (Dm - Dnm) + Km\ Im + KD\ Id + Bpm + Bnm$$
$$Dyo = Cy (Dy - Dny) + Ky\ Iy + Kd\ Id + Bpy + Bny$$

where:

$Dc$, $Dm$ and $Dy$: measured value of the negative density (LATD) to be printed $Ic$, $Im$ and $Iy$: number of color key steps (if no correction is made, 0)

Id: number of steps of the density keys (0 if no correction is made)

Kc, Km and Ky: value of step of the color key

Kd: value of step of the density key

Bpc, Bpm and Bpy: paper balance value (reference value is 0) constant within a paper channel constant with the negative channel (See the following table.)

Bnc, Bnm and Bny: negative type balance value (0 for the reference value)

Dnc, Dnm and Dny: density value for the reference negative (normal) of that negative type Cc, Cm, Cy: slope value (different values are each assumed for 0 and U as follows.)

breakdown:

Cco, Cmo and Cyo: overslope value of the negative type

Ccu, Cmu and Cyu: underslope value of the negative type

Dco, Dmo, Dyo: density value for controlling exposure For example, the exposure Er for red (R) is determined according to the following formula.

$$Er = En \times 10^{Dco} \quad (2)$$

Here, En is the exposure of the reference negative (normal) of the negative type and also the constant. The exposure of green (G), blue (B) is also determined by Dmo and Dyo.

Now, taking the minor density value change and $\gamma$ value of the cyan of the color paper as $\Delta Dpc$ and $\gamma c$ respectively, then $$\Delta Dpc = \gamma c \times \Delta \log(Er) \quad (3)$$

and the following formula (4) can be obtained according to the formulas (2) and (3).

$$\Delta Dpc = \gamma c \times \Delta Dco \times \log(En) \quad (4)$$

Thus $\Delta Dco$ can be evaluated according to the inverse operation. Assuming now that differences between the density value of the normal test print of the reference negative and the density value of the reference print are each $\Delta Dpc$, $\Delta Dpm$ and $\Delta Dpy$, if, for example, $\Delta Dpc$ is desired to set to zero and the operational result Dco of the above-described formula (1)

$$Dco' = Dco - \Delta Dco \quad (5)$$

then the $\Delta Dpc$ is canceled and that difference becomes zero. What constant should be changed depends on what density of the reference negative that negative assumes.

As in the formula (5), $$Dmo' = Dmo - \Delta Dmo \quad (6)$$

$$Dyo' = Dyo - \Delta Dyo \quad (7)$$

As a result, the condition is set as follows.

(1) case of the normal negative

The measured normal negative densities Dc, Dm and Dy are stored into Dnc, Dnm and Dny of that negative type channel.

A print of that normal negative is prepared and, from the difference between that density value and the density value of the reference print, modified values $\Delta Dco$, $\Delta Dmo$ and $\Delta Dyo$ are evaluated according to the above-described formulas (5), (6) and (7), and are stored into Bnc, Nnm and Bny of that negative type channel.

(2) case of the overnegative (conducted after above (1))

A print of that overnegative is prepared and, from a difference between that density value and the density value of the reference print, Dco', Dmo' and Dyo' are evaluated according to the foregoing formulae (5), (6) and (7), and overslope values Cco, Cmo and Cyo are inversely operated so that the operational results Dco, Dmo and Dyo of the foregoing formula (1) become these values, to store into Cco, Cmo and Cyo of the channel of that negative type.

(3) case of the undernegative (conducted after (1))

As in (2), Ccu, Cmu and Cyu are evaluated to store into Ccu, Cmu and Cyu of the channel of that negative type. In the foregoing equations (1), (2) and (3), the density value has conventionally been measured by humans and the channel of that negative type has been designated. If the constants included in the negative channel are tabulated, then the following results occur.

TABLE

| | negative type 1 | negative type 2 | negative type 3 | |
|---|---|---|---|---|
| B | Bnc Bnm Bny | Bnc Bnm Bny | Bnc Bnm Bny | ... |
| N | Dnc Dnm Dny | Dnc Dnm Dny | Dnc Dnm Dny | ... |
| O | Cco Cmo Cyo | Cco Cmo Cyo | Cco Cmo Cyo | ... |
| U | Ccu Cmu Cyu | Ccu Cmu Cyu | Ccu Cmu Cyu | ... |

Incidentally, since the above-described reference negative film gradually fades due to the light such as from the indoor fluorescent lamp or the print exposure, its service life is limited. When the exposure condition is corrected by using the reference negative film, it is determined by humans whether the used reference negative film exceeds the service life or not, and the reference negative film which exceeds the service life is not used to manage the reference negative film.

In addition, in the above-described printer processor, in order to manage and hold the standard exposure condition, the standard exposure condition, test print density, and the state of the developing solution are written on a management chart to manage the state of the printer processor. By utilizing such a management chart, a change of the state of the printer processor can be determined.

As described above, in the copying apparatus such as the printer or the like, the copying condition is set and managed by using the film for setting the copying condition, such as the standard negative film or the like.

However, the image density for setting the copying condition, which is recorded on the film for setting the copying condition, such as the above-described reference negative film or the like, exhibits a more or less distribution for each film for setting the copying condition. This distribution exerts an effect on setting of the copying condition, which has made it impossible to set appropriate copying conditions. In addition, since the appropriate copying condition cannot be set, the above-described management of the copying apparatus has suffered a certain influence and the precise state of the copying apparatus could not be grasped. In order to solve this and more accurately set the copying condition and manage the copying apparatus, it is necessary to apply various data such as the correction value for distribution of the image density or other correction values and match the film with the data to set the copying condition and manage the copying apparatus, which has made the work complicated.

In addition, for the film for setting the copying condition, which is used as the copying condition is set, since the management of the service life and the like is carried out by humans, the work is complicated and, if the film which expired the service life is used by accident, then the appropriate copying condition cannot be set.

The present invention was made in view of the above-described facts, and its object is to achieve a photosensitive material for controlling the condition, which easily makes it correspond to the condition managing data, and a film for setting the copying condition, which easily makes it correspond to various data.

In addition, it is an object of the present invention to achieve a condition managing method and an apparatus for processing a photosensitive material which allow the condition management to be readily and precisely carried out, and a copying apparatus which allows setting and managing of the copying condition to be readily and precisely carried out.

Here, by the condition management is meant a management of the performance of the processing solutions such as the developing performance of the developing solution or the state of the processing apparatus.

SUMMARY OF THE INVENTION

A specific embodiment of the present invention is provided with a data recording portion on which condition managing data for managing the processing condition for the photosensitive material is recorded.

According to this embodiment, since the photosensitive material for managing the condition and the condition managing data applied to the photosensitive material physically correspond, it is easy to make the condition managing data correspond to the photosensitive material for managing processing conditions. The present invention can take the general form of a photosensitive material for managing processing conditions, specific examples of which include a control strip for developing negatives, control strip for developing paper, a reference for film use as a reference during negative development condition management, and a reference print for use as a reference during paper development condition management.

Another embodiment of the present invention carries out condition management by developing the photosensitive material which is used in condition management. This photosensitive material is provided with a data recording portion on which a latent image for condition management condition managing data are recorded. Photometry is performed on the resultant image, while the condition managing data recorded on the data recording portion is read, and this data is used in managing the processing conditions of other photosensitive materials.

According to the thus arranged embodiment, the image on the photosensitive material for condition management is photometrically measured while the condition managing data recorded on the data recording portion is read and, using the photometric values and the condition managing data, condition management is carried out. Even if various condition managing data are recorded on the data recording portion, it is not necessary to make the condition managing data and the photosensitive material correspond, so that condition managing can be readily and precisely carried out.

A still another embodiment of the present invention provides an apparatus for processing the photosensitive material including a photosensitive material for managing the condition, on which a latent image for managing the condition and the condition managing data are recorded, the apparatus comprising a photometric means for photometrically measuring the image which results by the latent image being developed and revealed, a reader means for reading the condition managing data recorded on the data recording portion and a managing means for managing the condition by using the photometric value of the image and the read condition managing data.

According to this embodiment, the image which was developed and revealed is measured by the photometric means, and the condition managing data recorded on the data recording portion is read by the reader means so that the condition is managed by utilizing both the photometric value and the condition managing data. Thus, even if various condition managing data are recorded on the data recording portion, it is not necessary to make the condition managing data and the photosensitive material for managing the processing condition correspond to each other, so that the condition can be readily and precisely managed.

Further, according to another embodiment, the film for setting the copying condition is provided with an image for setting the copying condition of the copying apparatus and a data recording portion for recording data, and at least one of the film data for setting the copying condition and data for managing the copying condition is recorded on the above-described data recording portion. Accordingly, since the various data recorded on the film for setting the copying condition and the data recording portion physically correspond, it is easy to make the film for setting the copying condition and the various data correspond.

In addition, according to another embodiment of the present invention, the copying apparatus is provided with a photometric unit for copying the image of the film for setting the copying condition, which film is provided with a data recording portion on which an image for setting the copying condition and at least the data necessary for setting the copying condition are recorded, to photometrically measure a resulting image, a reading unit for reading the data recorded on the recording portion and a unit for setting at least the copying condition by utilizing the photometric value of the above-described image and the read data. In consequence, since the data for setting the copying condition and the film for setting the copying condition correspond, it is possible to readily and precisely set the copying condition. In addition, since the copying condition can be precisely set, the data of the copying apparatus can be precisely ascertained and the management of the copying apparatus can be precisely carried out. In addition, management of the film for setting the copying condition can be automatically carried out by recording data for managing the film for setting the copying condition, for example, the service life or the like for the film. As described above, according to this embodiment, it is possible to set and manage the copying condition readily and precisely.

DETAILED DESCRIPTION OF THE PREFERRED EMBODIMENTS

First Embodiment

A first embodiment of the present invention is hereinafter described in greater detail with reference to the accompanying drawings.

Figure 1:
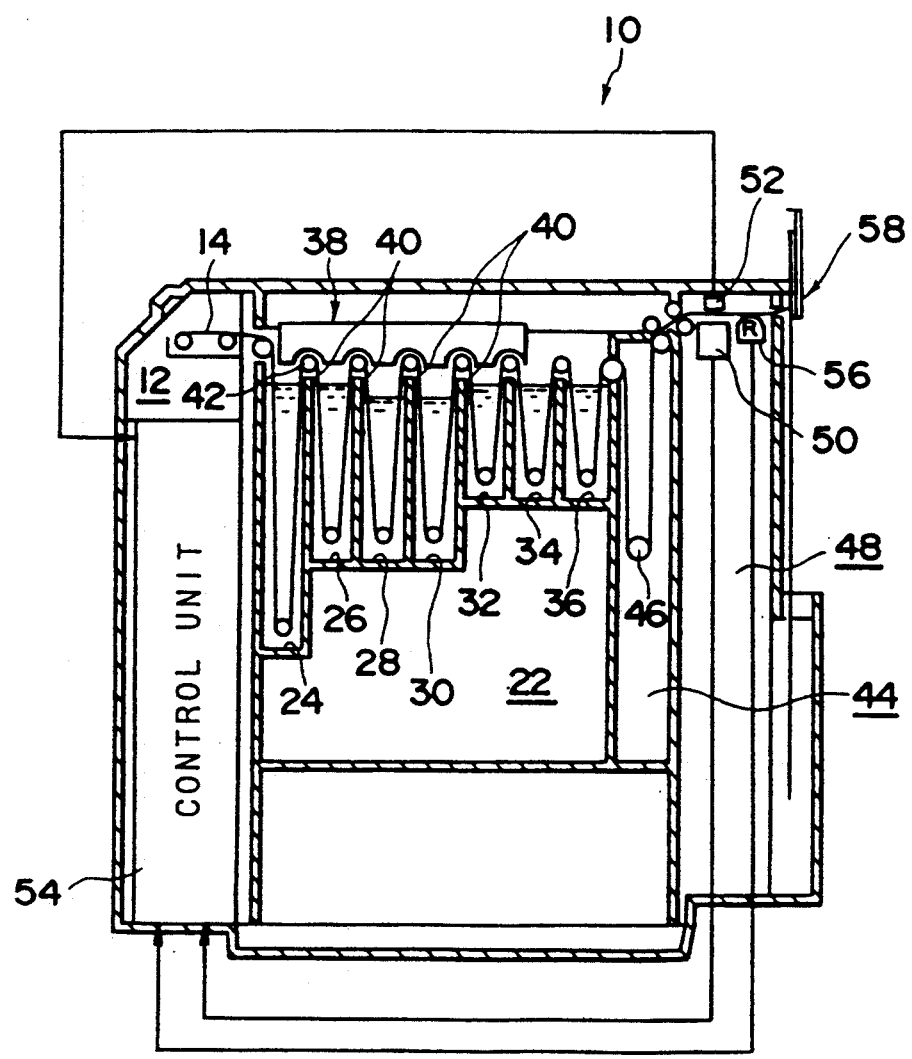
FIG. 1 is a schematic view of a film processor according to a first embodiment of the present invention.

FIG. 1 illustrates an example of a film processor 10 as an apparatus for processing the photosensitive material according to the present invention. The film processor 10 is provided with a film charging portion 12, which is opened by opening a lid (not shown) and a control strip for developing the negative or exposed negative film 14 is loaded therein.

Figure 2:
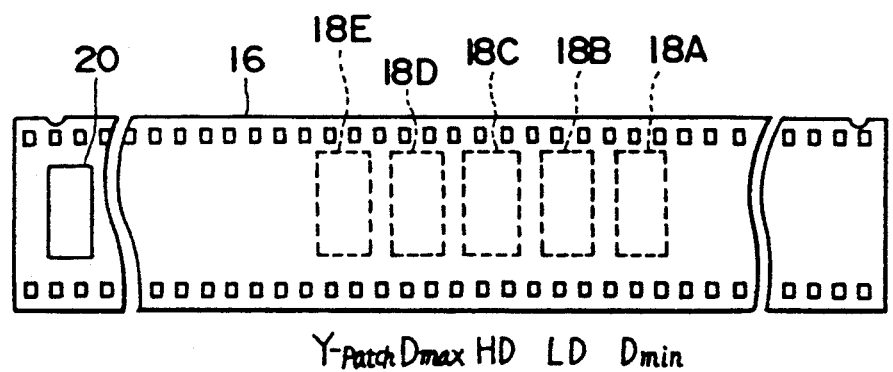
FIGS. 2 and 3 are respectively a plan view illustrating a negative developing control strip used in the first embodiment.

As shown in FIG. 2, a plurality of density measuring areas, for example, latent images 18A, 18B, 18C, 18D and 18E are recorded on the control strip 16 so that images of the lowest density Dmin (for example, base density), low density LD (for example, the density value of about Dmin+0.3), high density HD (for example, the density value greater than LD by 1.6), density Dmax for managing the color developing degree, and the density Y-patch for managing the desilverizing degree are recorded.

In addition, at the tip end portion of the control strip 16, a magnetic tape 20 is adhered at the data recording portion. A magnetic material is applied to the surface of the magnetic tape 20. On this magnetic tape 20, are the condition managing data corresponding to the control strip 16, the manufacturing data of the control strip 16, an aging correction factor for correlating aging changes such as the sensitivity of the control strip 16, correction values for the density value of each color: cyan (C), magenta (M) and yellow (Y) for the above-described LD, HD-LD and Dmin, and the managing limit values of LD, HD-LD and Dmin and the like. Incidentally, the correction value for the above-described density value is intended for correcting the deviation of the density values which occurs due to the variation of the quality of the control strip 16.

A negative film 14 charged in the film charging portion 12 is conveyed into a processor portion 22. Within the processor portion 22, processing tanks such as a developing tank 24, bleaching tank 26, bleaching/fixing tank 28, fixing tank 30, rinsing tanks 32 and 34 and a stabilizing tank 36 are sequentially disposed. Each processing tank stores a developing solution, bleaching solution, bleaching/fixing solution, fixing solution, rinsing solution and a stabilizing solution respectively. In addition, above each processing tank, a crossover rack 38 is disposed. The crossover rack 38 has a roller 42 corresponding to a partitioning plate 40 for partitioning each processing tank. A negative film 14 is wound about this roller 42 to form a conveying path for communicating with each processing tank. As a result, the negative film 14 is sequentially conveyed into each processing tank by means of a conveying system (not shown) and immersed within each processing solution to processed.

In addition, adjacent to the processor portion 22, a drying portion 44 is disposed. At the drying portion 44, a roller 46 is disposed and the negative film 14 delivered from the processor portion 22 is guided into the drying portion 44 by means of the above-described conveying system where, after it is dried while being wound about the roller 46, it is conveyed into a density measuring portion 48 adjacent to the drying portion 44.

The density measuring portion 48 is provided with an optical system 50 which comprises a light source and each filter of C, M and Y, and a densitometer 52 for measuring the density of the image recorded on the negative film 14. The optical system 50 and the densitometer 52 are connected to a control unit 54, which controls the optical system 50 and the densitometer 52 to measure the image density recorded on the dried film for each of C, M and Y. In addition, downstream of the densitometer 52, with the above-described control strip 16 conveyed, a read head 56 is disposed at a site corresponding to the above-described magnetic tape 20. The read head 56 is connected to the control unit 54 to read the condition managing data recorded on the magnetic tape 20 and output the result to a control unit 54.

Figure 3:
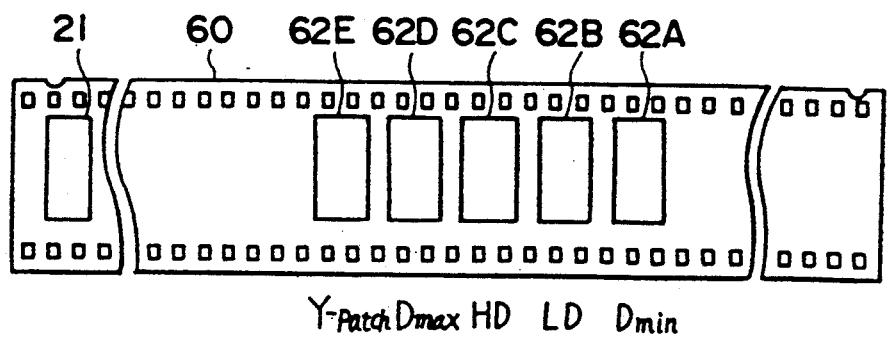

In addition, a density measuring portion 48 has a lid portion (not shown) on its upper portion so that a reference film 60 shown in FIG. 3 may be inserted into a film conveying path within the density measuring portion 48. The reference film 60 is processed with a standard developing solution and, as in the above-described control strip 16, images 62A, 62B, 62C, 62D and 62E each having a density: the lowest density Dmin, low density LD, high density HD, density for managing the developing degree Dmax, density for managing the desilverizing Y-patch, which are each the standard for each density, are recorded thereon. In addition, at the tip end of the reference film 60, as in the above-described control strip 16, a magnetic tape 21 is adhered. On this magnetic tape 21, the correction values for the density values of each image 62A, 62B, 62C, 62D and 62E recorded on the reference film and the management data such as the reference values for the density values of each image 62A, 62B, 62C, 62D and 62E are recorded. the above-described correction values for the density values are intended for correcting the deviation of the density values which occurs due to the variation of the quality of the reference film 60. In addition, the reference value of the above-described value is the density value as each of images 62A, 62B, 62C, 62D and 62E is measured in the normal state by a photometric system and, as will be later described, it is used as the reference value when the fluctuation of the photometric system, comprising the optical system 50 and the densitometer 52, is corrected.

The negative film 1 which has passed through the density measuring portion 48 is delivered to the outside of the film processor 10 by means of a film stocker 58.

Next, the operation of this first embodiment is described with reference to flow charts of FIGS. 4 and 5.

When condition management is carried out by evaluating the developing performance by the film processor 10 of this embodiment, the reference film 60 is first set to the density measuring portion 48 to measure the density, and thereafter, the control strip 16 is loaded into the film charging portion 12 for processing.

Figure 4:
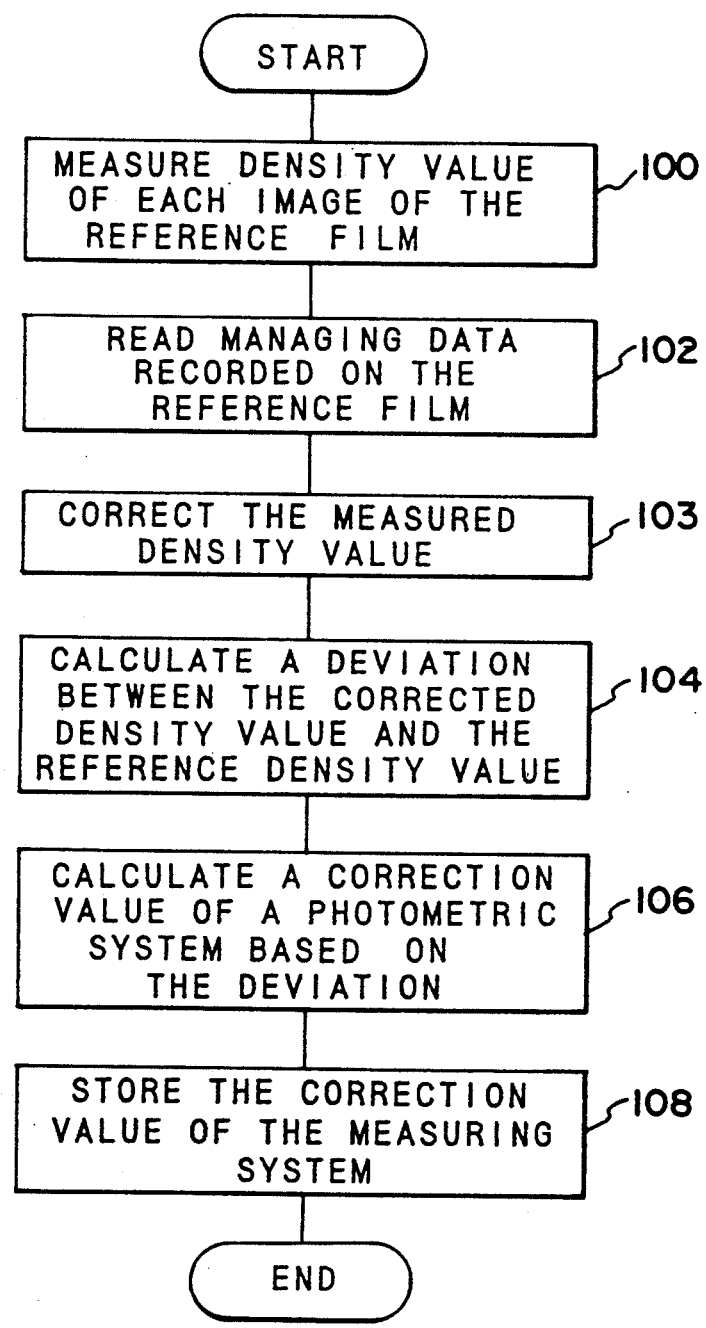
FIGS. 4 and 5 are respectively a flowchart for revealing the operation of the first embodiment.
Figure 5:
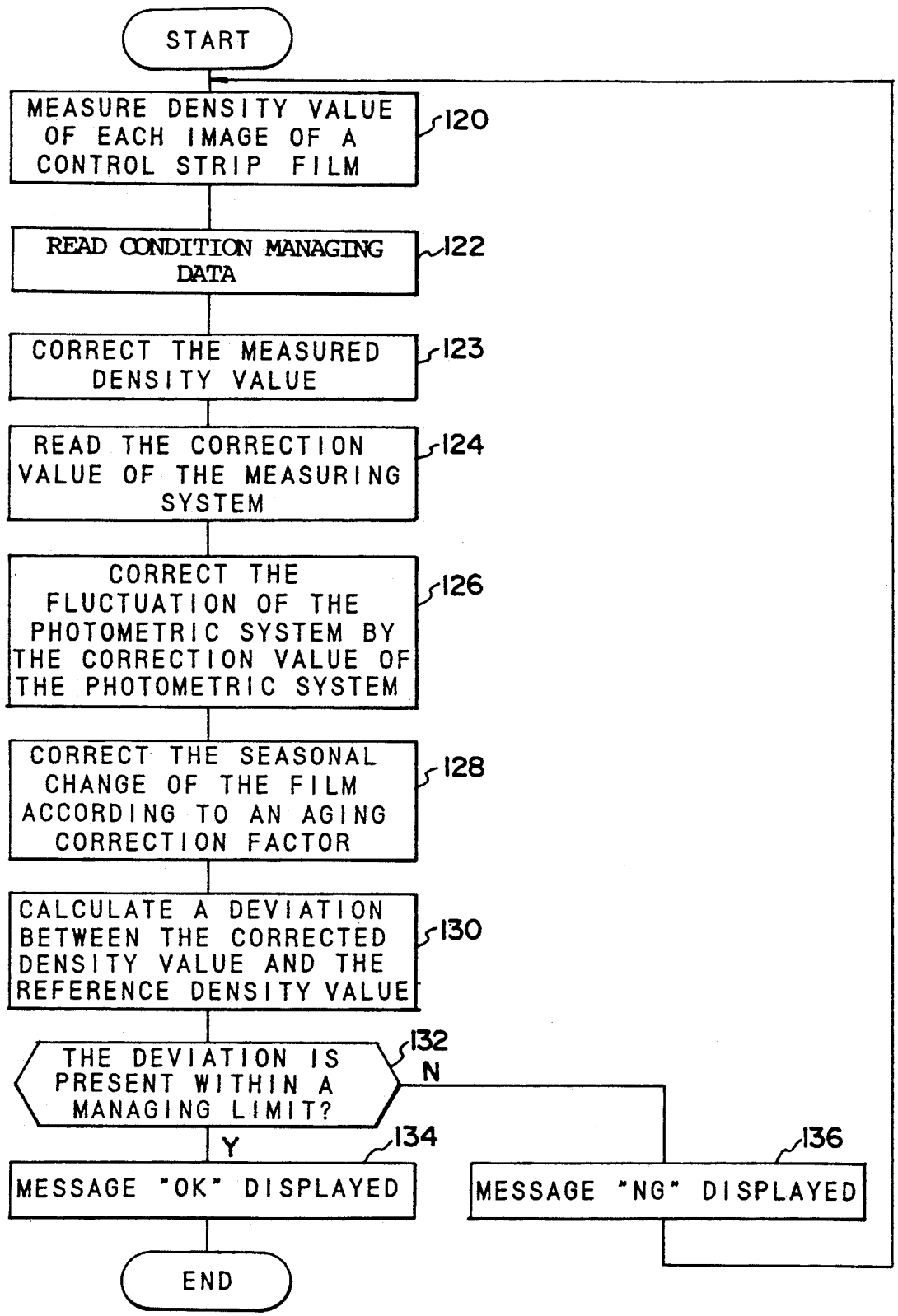

When the reference film 60 is to the density measuring portion 48, the flowchart of FIG. 4 is executed and, in step 100, the image density for each of colors C, M and Y of each image 62A, 62B, 62C, 62D and 62E recorded on the reference film 60 is measured by means of the densitometer 52. In step 102, the above-described management data recorded on the magnetic tape 20 of the reference film 60 is read out by means of the read head 56. In step 103, by using the correction value for the density value, which is included in the read management data, the density value measured in step 100 is corrected. Thus, the effect to the density value caused by the variation in the quality of the reference film 60 is eliminated.

In the next step 104, a deviation between the above-described corrected density value and the reference value included within the management data is calculated. The density value measured by the densitometer 52 deviates from the reference value according to the fluctuation of the photometric system, for example, the fluctuation of the light amount of the light source. Accordingly, the above-described deviation corresponds to the fluctuation of the photometric system.

In step 106, the correction value of the photometric system is calculated based on the deviation calculated in step 104. This correction value of the photometric value is determined so that when the above-described density value is further corrected using the correction value it may coincide with the above-described reference density. In step 108, the correction value of the photometric system is loaded into a memory of the control unit 54 to complete the operation.

Next, the control strip 16 is loaded into the film charging portion 12. The control strip 16 loaded within the film charging portion 12 is conveyed into the processor portion 22 and is sequentially conveyed through the developing tank 24, bleaching tank 26, bleaching-/fixing tank 28, fixing tank 30, rinsing tanks 32 and 34 and the stabilizing tank 36 where it is immersed into each processing solution for processing. As a result, latent images 19A, 18B, 18C, 18D and 18E are developed to form each image. The control strip 16 delivered from the processor portion 22 is dried by means of a drying portion 44 and the water adhering to its surface is removed. The dried control strip 16 is fed into the density measuring portion 48. As a result, the flowchart of FIG. 5 is executed.

In step 120, the density of each image formed on the control strip 16 is measured for each color of C, M and Y by means of the photometric system. In step 122, the above-described condition managing data recorded on the magnetic tape is read by means of the read head 56. In step 123, the density value measured in step 120 is corrected according to the correction value of the density value within the condition managing data. As a result, the effect to the density value caused by the variation of the quality of the control strip 16 is eliminated. In the next step 124, the correction value of the photometric system loaded within the memory in step 108 of the flowchart of FIG. 4 is read out. In step 126, the density value corrected in step 123 is further corrected according to the correction value of the photometric system. As a result, the density value from which the effect caused by the fluctuation of the photometric system is eliminated can be obtained.

In step 128, based on the manufacturing data included within the condition managing data, the number of days which have passed since the manufacturing date of the control strip 16 is calculated and, in step 126, the corrected density value is corrected according to the aging correction factor by utilizing the above-described number of days which have elapsed. By doing so the effect on the density value caused by the seasonal changing such as the sensitivity and the like of the control strip 16 is eliminated. In step 130, a deviation between the density value corrected in step 128 and the reference density value is calculated. As described above, the measured density value has now been subjected to various corrections and the deviation thus calculated corresponds to the difference between the developing performance for the standard developing solution and that for the film processor 10.

In step 132, it is determined whether this difference is within a managing limit value. If so, it is then determined that the developing performance of the film processor 10 is present within a permissible limit and, in step 134, a message meaning OK is displayed on a liquid crystal display to complete the operation. If not, then, since the developing performance of the film processor 10 deviates from the permissible limit, in step 136, a message meaning NG is displayed on the liquid crystal display or the like. Thus, the inspector inspects each processing solution of the film processor 10 and, after replenishing or replacing the solutions, the control strip 16 is loaded again into the film charging portion 12, and steps 120 through 132 are repeated.

As seen from above, according to this first embodiment, since the condition managing data recorded on the magnetic tape 20 adhered to the control strip 16 is read to conduct condition management, the control strip 16 and the various condition managing data physically correspond, which makes it easy to conduct condition management. In addition, more precise condition managing becomes possible by employing various condition managing data.

In addition, according to this first embodiment, since the magnetic tape 20 on which condition managing data is recorded is adhered to the control strip 16, the condition management can be automatically carried out using a mechanical method, and the present invention can be applied to the already prepared control strip 16.

According to this first embodiment, the magnetic tape 20 is adhered to the tip end portion of the control strip 16, although the tape 20 may be adhered on any portion of the control strip 16 where no latent image is recorded, and it may be adhered to the trailing or lateral end of the control strip 16.

In addition, the above-described managing limit value may be changed according to the severity of the target film tone, its workmanship and the type of processing machine or the like.

In addition, as the condition managing data to be recorded on the magnetic tape 20, a service life of the control strip 16 may be previously recorded to forbid use of the control strip 16 with an expired service life.

Although, in the first embodiment, the present invention is applied to the film processor 10 for developing another negative film 14, a paper developing control strip having a data recording portion on which the condition managing data is recorded may also be used to conduct the condition management by applying the above described steps of the present invention to the photosensitive material processing apparatus for developing the paper.

Second Embodiment

Next, a second embodiment of the present invention is described, the same reference numerals being used to identify the same portions as in the first embodiment, so that a description thereof is omitted.

Figure 6:
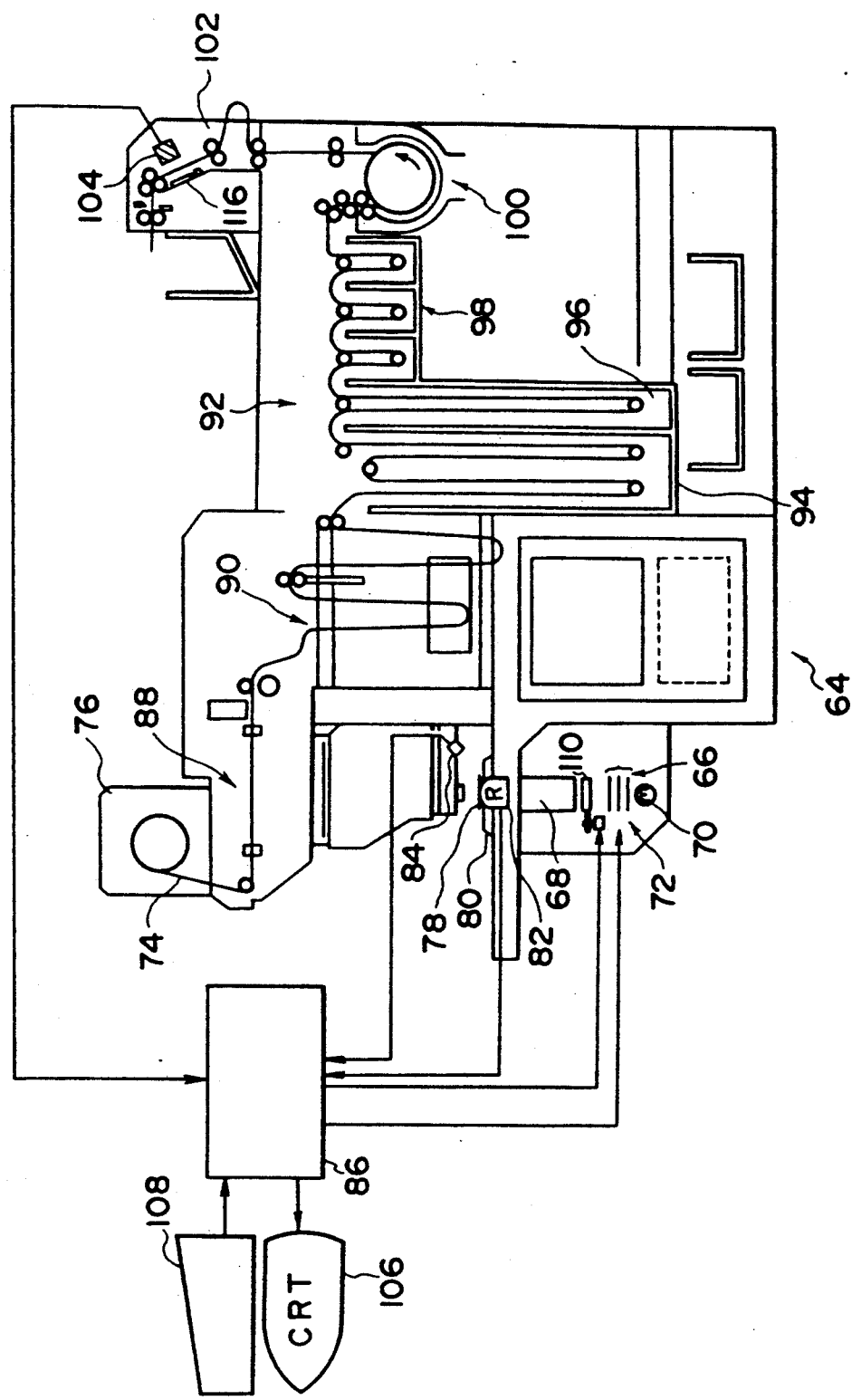
FIG. 6 is a schematic view illustrating a printer processor according to a second embodiment of the present invention.

In FIG. 6, a printer processor 6 of the present invention is illustrated. This printer processor 6 is provided with a light source portion 72 comprising a dimmer filter 66 comprised of C, M and Y filters, respectively, a light diffusion box 68 and a halogen lamp 70 and a paper magazine portion 76 for storing color paper 74. In addition, in the vicinity of a negative carrier 80 where the negative film 78 developed by the aforementioned film processor or the like is set, a read head 82 is attached for reading the condition setting data recorded on the magnetic tape 120 (see FIG. 7). In the neighborhood of the printing position of the negative carrier 80, a photometric instrument 84 comprised of a two-dimensional image sensor and the like for measuring the mean transparent density or the like of the image positioned the printing position is disposed. This photometric instrument 84 is connected to the control circuit 86 for determining the exposure according to the density of the above-described image, based on the standard exposure condition and the measured value, to control the dimmer filter 66 of the light source portion 72 for control of the exposure condition while evaluating the print quality and developing performance for management of the condition. For the color paper 74 withdrawn from a paper magazine portion 76, the image of the negative film 78 is printed at the exposure portion 88 and is supplied to a color developing portion 94 of the processor portion 92 via a reservoir portion 90. The color paper 74 developed at the color developing portion, after being fixed at the bleaching/fixing portion 96, is rinsed at the rinsing portion 98, and a color print is prepared. The rinsed color print, after being dried at the drying portion 100, is cut for each image frame at the cutter portion 102. At this cutter portion 102, a densitometer 104 is disposed so as to be connected to the control circuit 86 and so as to sandwich the conveyed color print.

On the opposite side of the densitometer 104 beyond a conveying path through which the color paper 74 is conveyed, a reference density plate 116 is disposed so as to face the densitometer 104. The densitometer 104 is controlled by the control circuit 86 every predetermined period of time when the color paper 74 is not being processed. The control circuit 86 monitors the fluctuation of the density value of the reference density plate 116 emitted every predetermined period of time from the densitometer 104, and calculates a correction value so that the density value of the reference density plate 116 emitted from the densitometer 104 becomes constant and corrects the density value emitted from the densitometer 104 during condition management, as described later according to the above-described correction value.

In addition, connected to the control circuit 86 is a CRT 106 for displaying data or the like and a keyboard 108 for entering data or the like.

Between the above-described dimmer filter 66 and the light diffusion box 68 is an extinction filter 110 insertable into the exposure path. This extinction filter 110 is controlled in its movement by means of the control circuit 86 and is inserted into the light path as necessary.

Figure 7:
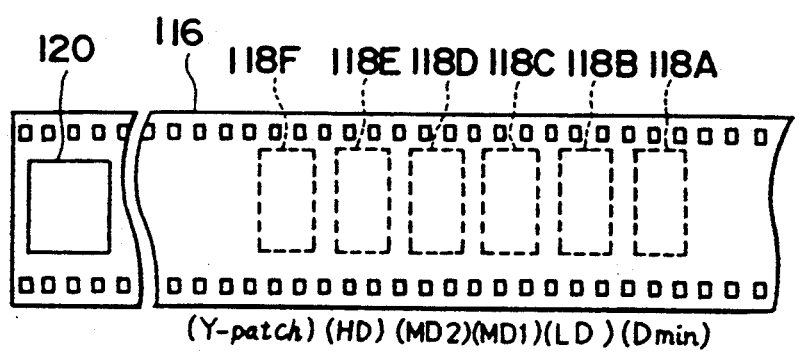
FIG. 7 is a plan view illustrating a negative developing control strip used in the second embodiment.

In this second embodiment, the control strip 116 for developing the negative is used for managing the condition such as developing of the film processor, as in the first embodiment, while the image recorded on the control strip 116 is printed onto the color paper 74. This color paper 74 is used for managing the condition for the developing and the like for the printer processor 64 as the control strip for developing paper. The control strip 116 for developing the negative has at least a density area between LD (low density portion) and HD (high density portion), which are the conventional measuring areas of the control strip. For example, other than at the area of the lowest density Dmin, lower density LD, high density HD and the density Y-patch for managing the desilverization, as shown in FIG. 7, latent images 118A, 118B, 118C, 118D, 118E and 118F are recorded and exposed so as to attain a first medium density MD1, for example, the density value around Dmin+0.7) and a second medium density MD2 (for example, the density value around Dmin+1.2). The measuring areas of medium densities MD1 and MD2 other than LD and HD are provided so that when LD and HD are printed on the paper, either one of them will deviate from the density reproducing area. Therefore, even more thinly divided density steps may be provided on the film other than LD and HD.

On the magnetic tape 120 adhered to the control strip 116 for developing the negative, in addition to the condition managing data described with reference to the first embodiment, an identification code for identifying whether it is the control strip 116 for developing the negative or not, a target density value of the image to be printed on the color paper 74, which is used as the control strip for developing the paper, a reference value used in evaluating the developing performance and a standard exposure condition as the image is printed from the negative film 78 onto the color paper 74 are recorded.

Figure 9:
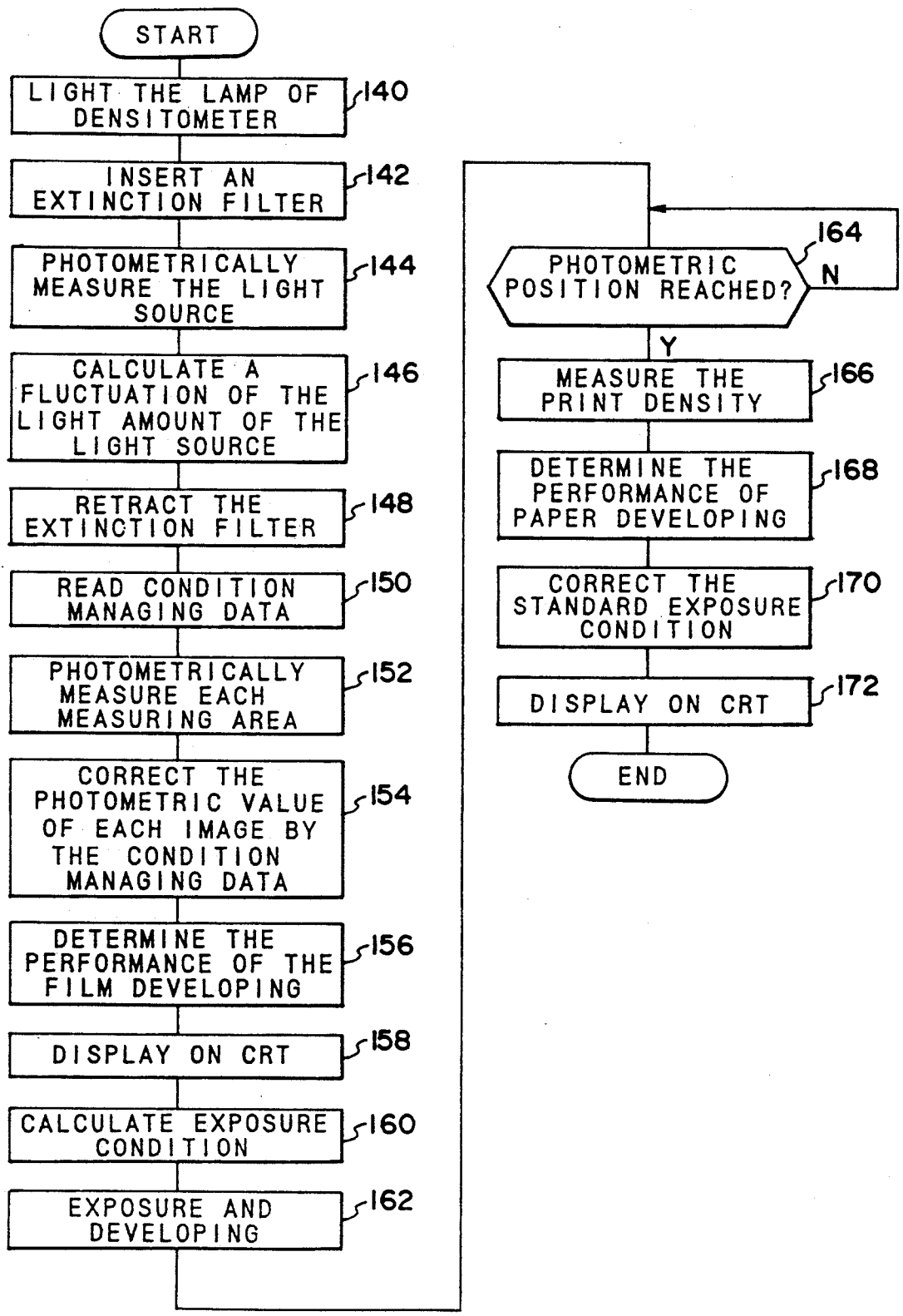
FIG. 9 is a flowchart for revealing the operation of the second embodiment.

Next, with reference to a flowchart of FIG. 9, the operation of this second embodiment is described. The flowchart of FIG. 9 is executed when a switch for evaluating the print (not shown) is turned ON.

In step 140, a lamp of the densitometer 104 is lit. About three to ten seconds after the lamp is lit, it becomes possible to measure the density using the densitometer 104. In step 142, the extinction filter 110 is inserted into the exposure path and, in step 144, the light amount illuminated from a halogen lamp 70 of the light source portion 72 via the extinction filter 110 is measured. The extinction filter is inserted in order to prevent saturation of the output of the photometric instrument 84 when the correction value or reference value for the fluctuation of the light amount of the light source is obtained.

In step 146, the fluctuation of the light amount of the light source is calculated. The photometric value of the light amount of the light source and the reference value previously stored within the memory or the like (or the photometric value for the preceding time) are compared to examine the change of the light amount of the light source to obtain the correction value relative to the fluctuation of the light amount of the light source. In addition, according to another method, the photometric value obtained as the extinction filter 110 is inserted may be adopted as the reference value (for example, the density 0.00), or as in the first embodiment, the correction value for the fluctuating light amount of the light source may be obtained by using the reference film 60.

In the next step 148, the extinction filter 110 is retracted from within the exposure light path. An operator develops the control strip 116 for developing in advance by the film processor to set the resulting negative film 78 to the negative carrier 80. In step 150, the condition managing data recorded on the magnetic tape 120 is read by the read head 82.

In the next step 152, each measuring area for the negative film 78 is measured by means of the photometric instrument 84. Measurement may be made for each single measuring area, or a plurality of measuring areas may be simultaneously measured using a two-dimensional image sensor. In step 154, the values for managing the film developing, that is, the photometric value for the low density LD, contrast (HD−LD) obtained by subtracting the photometric value for the low density LD from the photometric value of the high density HD, photometric value for the lowest density Dmin and the photometric value of the density for managing the desilverization Y-patch are corrected as in the first embodiment. That is, the correction for the fluctuating light amount of the light source by using the correction value evaluated in step 146, correction of the dispersion of the quality of the negative film 78 by using the correction value for the density value included within the condition management data and the correction for the seasonal change by using the aging correction factor included within the condition managing data are conducted.

In step 156, the density value corrected in step 154 and the managing limit value for each density value read out as one of the condition managing data are compared to determine the film developing performance. In order to evaluate the print quality, only the contrast for three primaries (HD−LD) may be used as the film managing value. The low density LD is used as the film sensitivity and the sensitivity balances are managed, and the lowest density Dmin used as the blushing by the developing solution is determined. This is because they can be corrected by the printer. Even if the low density LD or the lowest density Dmin deviates from the conventional permissible limit, if the contrast (HD−LD) is present within the permissible limit, then the resulting print quality can be said to be within the permissible limit. In step 158, the above-described result of the film developing performance and the photometric value of the negative film 78 are displayed on the CRT 106.

In step 160, the exposure condition is calculated by using the standard exposure condition read out as one of the condition managing data and the photometric value measured in step 152 and corrected in step 154. In order to evaluate the paper developing performance, it is necessary that the HD or LD measuring areas and at least one of the measuring areas present therebetween be printed with the same exposure. In consequence, for example, the weighted mean of MD1 and LD and the weighted mean of MD2 and HD are evaluated as each of the image density according to the following equations:

$$(a \times MD1 + b \times LD)/(a+b)$$

for MD1 and LD and $$(a \times HD + b \times MD2)/(a+b)$$

for MD2 and HD, and where a and b are positive coefficients, so that it is possible to calculate the exposure using the above-described standard exposure condition.

In step 162, using the above-described exposure condition, the image of the negative film 78 is printed onto the color paper 74 to prepare the control strip for developing the paper. Incidentally, when the image is printed, for the exposure determined for either one of the specific images of the negative film 78, the exposure of each image may be changed to a certain amount, for example, twice to three times to print the image onto the color paper 74.

Figure 8:
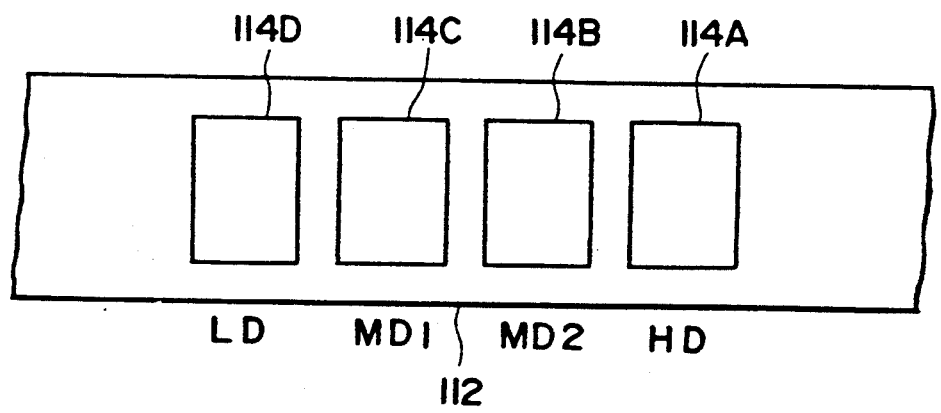
FIG. 8 is a plan view illustrating a paper developing control strip.

In the next step 164, it is determined whether a predetermined period of time has elapsed after the image is exposed, and it is determined whether the print formed by the paper developing control strip being developed, fixed, rinsed and dried has reached the photometric position. On the paper developing control strip 112 processed at the processor portion 92 and the drying portion 100, the images 114A through 114D as shown in FIG. 8 are formed. When it is determined that the print has reached the photometric position, then, in step 166, the density of the image 114 is measured.

In the next step 168, using the photometric values of the printed high density or the printed first medium density MD1, the deviation HD−MD obtained by subtracting the photometric value of the second medium density MD2 from the photometric value of the printed high density HD or the deviation MD1−LD obtained by subtracting the photometric value of the low density LD from the photometric value of the printed first medium density MD1 and the photometric value for the non-exposed portion taken as the photometric value of the lowest density Dmin, the deviation between each photometric value of HD, or MD1, (HD−MD2) or (MD1−LD) and Dmin, and the reference value read out as one of the condition managing data is calculated to determine the developing performance of paper. If this deviation is above, for example, ±0.15, then it is abnormal and, if it is within a range of ±0.10 to ±0.15, then it is determined to be an alarm value. From the printed high density HD and the printed medium density MD1, the sensitivity of the paper and the sensitivity balance can be determined. This fluctuation of the performance can be corrected by modifying the standard exposure condition of the printer and is not always necessary.

In the next step 170, the photometric value of the printed medium density MD1 or the photometric value of the printed low density LD and the target density value read out as one of the above-described data for setting the condition are compared, and the color balance value of the standard exposure condition is corrected so that the photometric value may become the target value, to store into the memory. In addition, a slope control value of the standard exposure condition is corrected so that the printed high density HD may become the target density, to store into the memory. In step 172, the above-described photometric value, the determined result and the corrected result of the standard exposure condition are displayed on the CRT 106.

As described above, this second embodiment exhibits an advantage over the first embodiment while allowing the paper developing performance to be evaluated by preparing only the negative developing control strip without preparing the paper developing control strip when the paper developing performance is evaluated.

In addition, since the paper quality is determined by combining the film developing and the paper developing simultaneously with the performance evaluation of the film developing solution and the paper developing solution, it is possible to predict the approximate print quality.

In addition, since the standard exposure condition is corrected according to the print obtained from the paper developing control strip, a standard exposure condition which may be appropriately corrected for the developing performance of the used film can be set. The evaluation of the developing solution according to the conventional control strip has been intended for each solution and not for the system as a whole. Accordingly, even if the density deviates from the managing limit, it is often permissible on the print, which has resulted in an unreliable evaluation by the control strip. Meanwhile, according to this second embodiment, an evaluation result corresponding to the actual print quality can be obtained.

Incidentally, the data recorded on the magnetic tape 20(120) is not necessarily restricted to the foregoing, but, for example, a data evaluating method may be previously recorded as the condition managing data on the magnetic tape 20(120) so that, in accordance with this data evaluating method, for example, the evaluation of the print tone may be conducted. In addition, the number, position, shape and the like of the latent image for managing the condition are not restricted to the first and second embodiments.

The data recording portion of the present invention may be joined so that the magnetic recording band becomes integral with this condition control photosensitive material. In addition, a magnetic layer may be formed at the tip end, trailing end, both sides or one side of the photosensitive material as viewed in the crosswise direction. Still further, an optically transparent magnetic layer may be provided on the surface or rear surface of the photosensitive material (See U.S. Pat. Nos. 4,302,523, 3,782,947 and 4,279,945). Although, in the first and second embodiments, the magnetic tape 20(120), on which the condition managing data is recorded, was used as the data recording portion, the present invention is not restricted to this, and a bar code, which represents the condition managing data, may be used as the data recording portion so that the above-described condition managing data is read by a read means comprised of an optical sensor or the like.

In addition, although, in this embodiment, measuring of the condition managing photosensitive material and reading of the condition managing data are conducted by the processor portion or the printer portion, they may be conducted by the densitometer, which is independent of those. In this case, a management chart can effectively be prepared based on the measured value and the managing data.

A third embodiment of the present invention is described below.

This embodiment is applied to the printer processor of the copying machine and to the reference negative film as the film for setting the copying condition, which is used in this printer processor.

Figure 10:
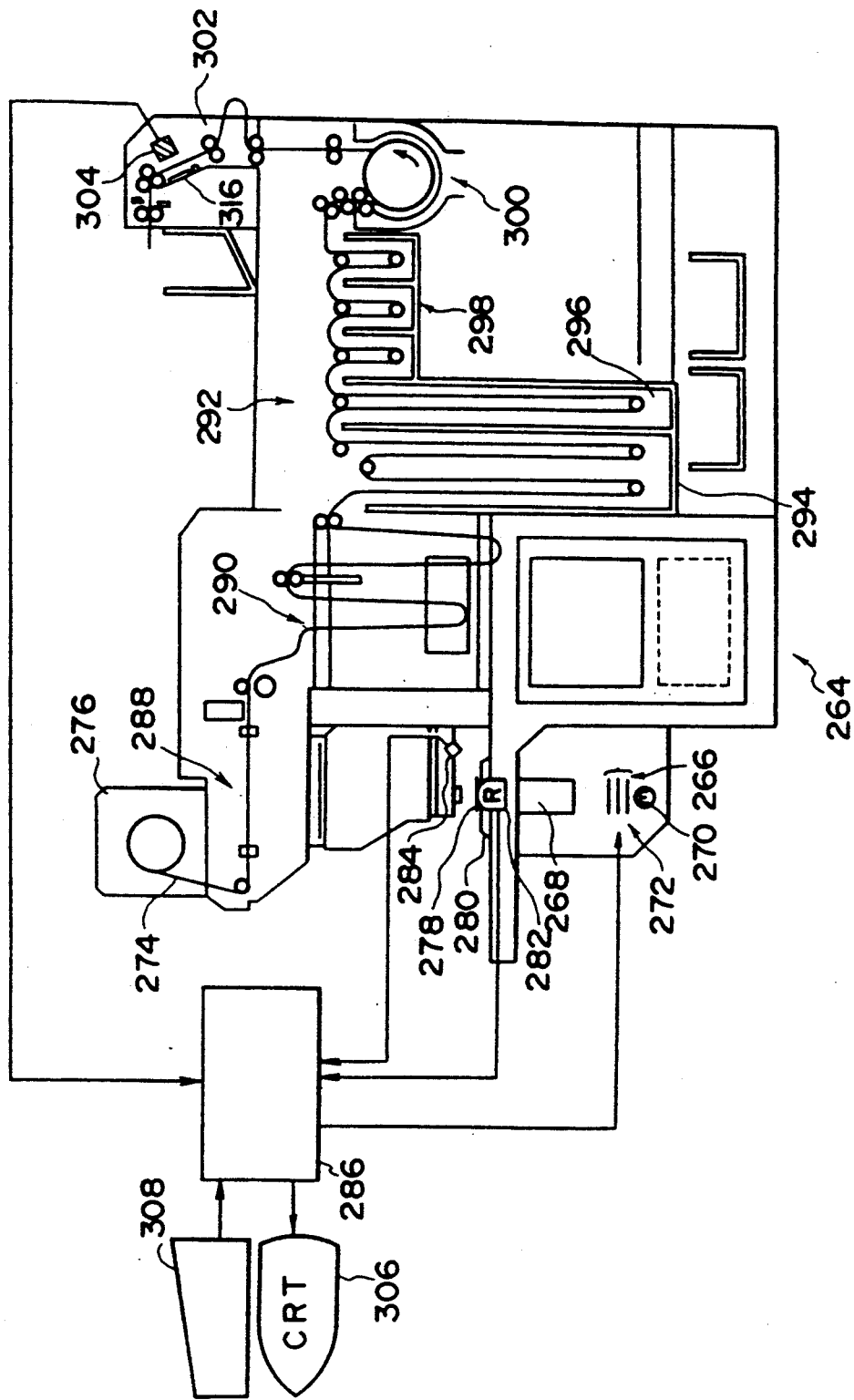
FIG. 10 is a schematic view illustrating a printer processor according to a third embodiment of the present invention.

In FIG. 10, a printer processor 264, which serves as the copying apparatus according to the present invention, is illustrated. The printer processor 264 has a negative carrier 280, to which a reference negative film or a developed negative film 278 is sent as the film for setting the copying condition.

Figure 11:
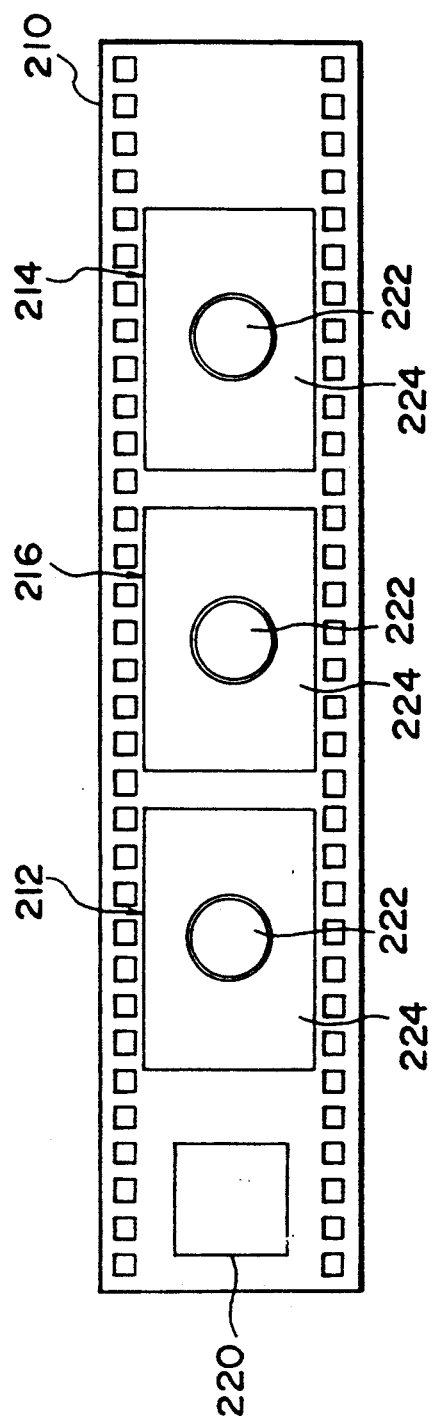
FIG. 11 is a plan view illustrating a reference negative film used in a printer processor according to a third embodiment of the present invention.

As shown in FIG. 11, the reference negative film 210 is prepared by exposing and developing an underexposure color negative image 212, an overexposure color negative image 214 and a standard color negative image 216 under a predetermined condition. Each negative image is comprised of a gray portion 22 corresponding to the negative which photographed a gray object, and an average object portion 224 corresponding to the negative which photographed an average object, the average object portion being provided about the gray portion 22. Along with the above-described three negative images 212, 214 and 216, ultra-overexposure color negative image may be prepared.

At the tip end of the reference negative film 210, a magnetic tape 220 on the surface of which a magnetic material is applied is adhered as the data recording portion. On this magnetic tape 220, as the data for setting and managing the copying condition, data representing the service limit of the reference negative film 210, data representing the initially set value of the standard exposure condition, and the correction value data for correcting the density value of each image of the test print in correspondence with the dispersion of the density value for each reference negative film 210 of the negative image and the like are recorded. In addition, as the data on the reference negative film 210, correction value data for correcting the photometric value of the negative value in correspondence with the dispersion of the density value for each reference negative film 210 of the negative image and data on the film characteristic of the reference negative film 210 are recorded.

Each negative image of the reference negative film 210 gradually fades due to the light of the indoor fluorescent lamp or the exposure of the print. Therefore, the above-described service time limit of the reference negative film 210 is defined by the service time and the number of exposures to be served from the data when the service was initiated, and the above-described service time limit data are recorded as data representing three months from the date when the service was initiated and 200 times as the number of the service exposure. Incidentally, the site where the magnetic tape 220 is adhered may be the trailing end or lateral end if it is on the side where the image of the reference negative film 210 is not recorded.

The above-described data representing the initially set value of the standard exposure conditions is for setting the standard exposure condition to the printer processor 264 when it is installed, and it is comprised of data such as the color balance, slope coefficient, standard exposure time and the like. In addition, on the magnetic tape 220, a write area for writing the data on the date when the service was initiated, number of the print exposure and the like is also provided. The initial value of the area where the above-described number of the print exposure is written is set to zero.

The above-described printer processor 264 is comprised of a light source portion 272 having a dimmer filter 266 comprising C, M and Y filters, a light diffusion box 68 and a halogen lamp 270, and a paper magazine portion 276 for storing color paper 274. In addition, in the neighborhood of the negative carrier 280, a magnetic head 282 is attached for reading various data recorded on the magnetic tape 220 while writing data onto the magnetic tape 220. In the neighborhood of the printing position of the negative carrier 280, a photometric instrument 284 is disposed, the photometric instrument 284 being comprised of a two-dimensional sensor for measuring the average density of the image positioned at the printing position. This photometric instrument 284 determines the exposure according to the density of the image recorded on the negative film 278 based on the standard exposure condition and the photometric value, and is connected to a control circuit 286 for controlling a dimmer filter 266 of the light source portion 272 to control the exposure condition.

The color paper 274 withdrawn from the paper magazine 276 is printed with the image of the negative film 278 at the exposure portion 288 and is supplied to the color developing portion 294 of the processor portion 292 via the reservoir portion 290. The color paper 274 developed at the color developing portion 294, after being fixed at the bleaching/fixing portion 296, is rinsed at the rinsing portion 298 to prepare a color print. The rinsed color print, after being dried at drying portion 300, is cut into image frames at the cutter portion 302. At this cutter portion 302, is a densitometer 304 connected to the control circuit 286 so as to sandwich the conveyed color print. On the opposite side of the densitometer 304, beyond the conveying path of the color paper 274, a reference density plate 316 having an image of reference density is disposed so as to oppose the densitometer 304.

In addition, connected to the control circuit 286, is a CRT 306 for displaying data or the like and a keyboard 308 for entering data, while, in the memory of the control circuit 286, a storage area of the managing data is provided.

Figure 12:
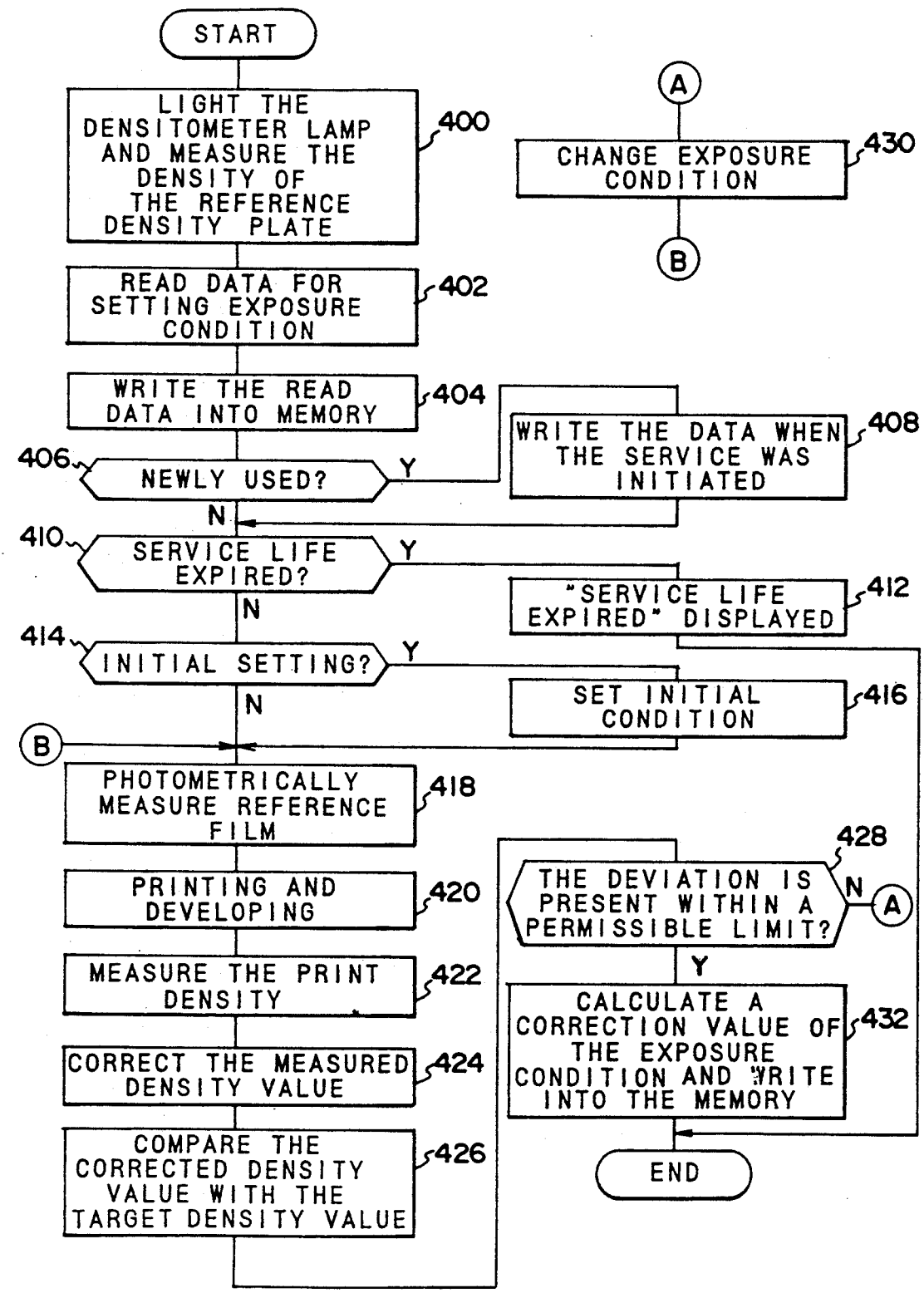
FIGS. 12 and 13 are respectively a flowchart for revealing the operation of the third embodiment.

Next, the operation of this embodiment is described with reference to a flowchart of FIG. 12. The flowchart of FIG. 12 is executed when a switch for setting the exposure condition is turned ON with the reference negative film 210 set to the negative carrier 280.

In step 400, a lamp of the densitometer 304 is lit. About a few to ten seconds after the lamp is lit, it becomes possible to measure the density of the densitometer 310, and the density of the reference density plate 316 is measured to write the density value into a memory (not shown) of the control circuit 286. In step 402, various data recorded on the magnetic tape 220 of the reference negative film 210 is read by means of the magnetic head 282. In step 404, the read data is written into the memory.

In step 406, it is determined whether the reference negative film 210 set to the negative carrier 280 is a newly used reference negative film. This determination is conducted for the various read data by referencing the data written into the area of the reference negative film 210, into which the number of the print exposure is written, and determining whether the value of that data is zero. If the value of the above-described data is zero, then it is determined that the reference negative film 210 set to the negative carrier 280 is a newly used reference negative film and, in step 408, the current data is written into the magnetic tape 220 as the data on the date when the service was initiated by means of the magnetic head 282.

In step 410, it is determined whether the service time limit for the used reference negative film 210 has expired. This determination of the service time limit, as described above, is conducted by determining whether the time after the data when the service was initiated is exceeded or not and whether the number of the print exposures reached the number of the service limit exposures or not. If at least either one of the above-described two determinations is affirmed, then it is determined that the service time limit has expired. If the determination in step 410 is affirmative, then, in step 412, a message 'service time limit expired' is displayed on the CRT 306 to complete the operation. As described above, since the management of the reference negative film 210 is automatically conducted, it is possible to avoid accidentally using the reference negative film 210 having an expired service time limit such that the appropriate exposure condition cannot be set. If the period of time remaining until the service time limit is reached is small (for example, about one week), then an alarm may be issued for informing an operator of this fact.

If the determination of step 410 is negated, then the procedure is shifted to step 414, where it is determined whether the initial setting of the standard exposure condition should be conducted. The printer processor 264 according to the present invention conducts the initial setting of the standard exposure condition at the time of its installation and, thereafter, evaluates the exposure condition by using this standard exposure condition. If the setting of the exposure condition for this time is the first after the printer processor 264 is installed, then, of the data read in step 416, the initially set value of the standard exposure condition is written into the memory of the control circuit 286 to use as the standard exposure condition of the printer processor 264.

In step 418, each negative image recorded on the reference negative film 210 is photometrically measured by the photometric instrument 284. The photometric operation may be conducted for each single negative image, or using the two-dimensional sensor, a plurality of measuring areas may be simultaneously measured. The photometric value of the negative image is corrected based on the correction value data for correcting the dispersion of the density values among the above-described various data and data on the reference negative film 210 such as the film characteristic data of the reference negative film 210. The photometric value for each negative image is written into the managing data storage area of the memory together with the date.

In step 420, the exposure condition is determined based on the above-described set standard exposure condition and corrected photometric value of the negative image, and in accordance with this exposure condition, the optical system is controlled to print the image of the reference negative film 210 onto the color paper 274. Next, the printed color paper 274 is subjected to the developing, fixing, rinsing and drying steps to prepare a test print. In this case, a standard color negative image 216 is used for the adjustments of the fluctuating condition of the printer processor 264, color balance after the print lamp is exchanged and after the developing solution is exchanged, seasonal change of the object balance of the negative, emulsion number balance of the color paper 274 or the like. In addition, in order to adjust the under-negative balance of a currently used channel, an underexposure color negative image 212 is used and, in order to adjust an over-negative balance of the currently used channel, an overexposure color negative image 214 is used. In addition, at the same time, data on the number of the print exposures recorded on the magnetic tape 220 is counted to write onto the magnetic tape 220.

In the next step 422, when a predetermined period of time has passed after exposure, and the image of the color paper 274 reaches the photometric position of the densitometer 310, the densitometer 304 is actuated to measure the density of each image of the test print. The density value of each image of this test print is written into the managing data storage area together with the date. In step 424, the measured density value is corrected by the correction value data within the read data. As a result, a density value from which the effect by the dispersion of the density of the negative image for each of the reference negative film 210 can be obtained. A target density value (described later) may be corrected in correspondence with the dispersion of the density value for each reference negative film 210 of the negative image.

In step 426, the corrected density value and the target density value are compared to calculate a deviation. In step 428, it is determined whether the above-described deviation is present within the permissible limit out of. If it is out of the permissible limit, then, in step 430, the exposure condition is changed to return to step 418, and steps 418 through 430 are repeated until the determination in step 428 is affirmed.

If the determination in step 428 is affirmed, then the procedure is shifted to step 432 to calculate the correction values such as the slope control value, color balance value and the like according to the above-described formulae (5), (6) and (7) to correct the standard exposure condition, and these correction values are written onto a predetermined channel present on the memory to complete the operation. By this correction value, an appropriate standard exposure condition is set anew and, thereafter, using this standard exposure condition, the printing operation is conducted. These standard exposure condition and correction values are written onto the managing data storage area of the memory together with the data.

Figure 13:
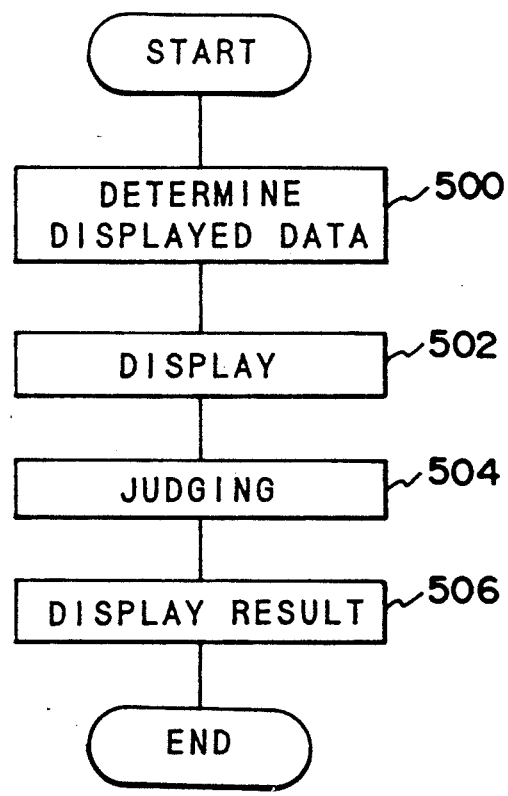

Next, referring to a flowchart of FIG. 13, the management of the printer processor 264 is described. This flowchart is executed when the type of data to be displayed is specified by the keyboard 308 and a managing switch (not shown) is turned ON.

In step 500, the data to be displayed is discriminated and the discriminated data is read out from the managing data storage area on the memory. In step 502, the read data is displayed in time series on the CRT 306. As a displaying method, for example, data is represented along the vertical axis with the time axis as the horizontal axis. The method of displaying data varies with its object. Accordingly, a control chart, histogram, cumulative distribution chart, color coordinate chart, table or a graph may be chosen. In the next step 504, trends of data represented by the judging operation such as a statistical processing are determined and, in step 506, the judged result is displayed on the CRT 306. For displaying the judged result, the value obtained by the judged operation such as the statistical processing or the like and the reference value are compared to display a result such as caution, warning, prescription or the like. The judged result in step 504 may be obtained by applying a softwared expert system, fuzzy logic, or neutral network or the like other than the statistical processing. Incidentally, for these judgments, other than the displayed data, other managing data representing the state of the printer processor 264 is preferably used to judge in a synthetic manner.

As described above, since, in this embodiment, the data recorded on the magnetic tape 220 adhered to the reference negative film 210 is read to set and manage the exposure condition, the reference negative film 210 and various data physically correspond, which can ease setting and management of the exposure condition. In addition, the various data allow the exposure condition to be more precisely set and managed.

In addition, according to this embodiment, since the magnetic tape 220 on which various data is recorded is adhered to the reference negative film 10, setting and management of the exposure condition can be automatically conducted in a mechanical manner, and the present invention is also applicable to the already prepared reference negative film 210.

The data recorded on the magnetic tape 220 is not restricted to the foregoing. For example, as the data recorded on the magnetic tape 220, the aging correction factor for correcting the seasonal fading of the reference negative film 210, correction value for correcting the deviation of the density values, which occurs due to the variation in the quality of the reference density plate 316, the correcting pattern for each light source of object, name of the manufacturer of the reference negative film 210, code representing the kind of the film (so-called DX code), printer-used channel, reference density for each kind of the printer, code table for each kind of the printer and the like may be recorded. By doing so, it is possible to determine the density value from which the effect caused by the seasonal fading of the reference negative film 210 and the variation the quality of the reference negative film 316 is eliminated, while an appropriate exposure condition corresponding to the reference negative film 210 can be set.

In addition, the content of the data recorded on the magnetic tape 220 can be modified or changed depending on the region or season in which the reference negative film 210 is used. Thus, the exposure condition corresponding to the region or season can be set.

Further, data on the reference negative film 210 such as the kind of film and the like may be recorded on the magnetic tape 220 and written onto the storage area of the managing data so that when the processing conditions further printer processor 264 are managed, the processing and displaying are conducted for each type of the reference negative film 210.

In addition, data for managing the developing condition may be recorded on the magnetic tape 220 while a test print on which the image of the reference negative film 210 is printed may be used for condition managing such as evaluation of the developing solution of the printer processor 264. By, as compared with the evaluation of the developing solution by the conventional control strip, a result of evaluation corresponding to an actual print quality can be obtained.

In addition, although, in this embodiment, the magnetic tape 220 on which various data are recorded is used as the data recording portion, the present invention is not necessarily restricted to this, but, for example, a magnetic material may be directly coated on portions other than the photographed image portion of the film, or a transparent magnetic material may be coated on the entire or partial rear or front surface of the film. In addition, as the data recording portion, for example, a bar code representing data for setting and managing the copying condition may be used to read the above-described data by means of a read means comprising an optical sensor or the like, or a film for setting the copying condition may be stored within a cartridge and a data recording portion may be provided on the cartridge. In addition, the magnetic recording portion may be comprised of an IC card or LSI card independent of a film for setting the copying condition.

In addition, although, in this embodiment, the present invention is applied to the printer processor 264, it may be applied to any copying apparatus in which the copying condition is set and managed by the film for setting the copying condition.

What is claimed is:

1. Condition managing photosensitive material for managing a processing condition, comprising:
   a condition managing photosensitive material body; and
   a data recording portion provided on said condition managing photosensitive material body, and on which condition managing data is recorded, and wherein latent images are recorded on said condition managing photosensitive material body, said condition managing data and said latent images being used to manage at least one of processing and exposure conditions of another photosensitive material.

2. Condition managing photosensitive material for managing a processing condition as defined in claim 1, wherein said data recording portion comprises a magnetic recording material.

3. Condition managing photosensitive material as defined in claim 2, wherein said magnetic recording material comprises a magnetic tape, and the magnetic tape is adhered to said condition managing photosensitive material.

4. Condition managing photosensitive material as defined in claim 1 wherein said condition managing data includes at least the manufacturing data of said condition managing photosensitive material, managing correction value for correcting a seasonal change of the sensitivity of said condition managing photosensitive material, and a correction value for correcting the density of an image obtained by said condition managing photosensitive material being developed.

5. Condition managing photosensitive material as defined in claim 1 wherein said condition managing data includes a service time limit of said condition managing photosensitive material.

6. Condition manage photosensitive material as defined in claim 1 wherein said condition managing photosensitive material comprises a film developing control strip.

7. Condition managing photosensitive material as defined in claim 1, wherein said condition managing data includes at least a correction value for correcting a density of an image, and wherein said correction value is obtained by development of said condition managing photosensitive material.

8. Condition managing photosensitive material as defined in claim 7, wherein said condition managing data includes at least a standard exposure condition under which said another photosensitive material is printed.

9. Film for setting a copying condition comprising:
   an image for setting a copying condition of a copying apparatus; and
   a data recording portion on which at least one of the film data, data on the set copying condition and the data on the managed copying condition.

10. Film for setting a copying condition as defined in claim 9 wherein said film data includes correction value data for correcting the photometric value of the image in corresponding with the dispersion of the density value of the image for each film for setting the copying condition and film characteristic data for said film, 11. Film for setting the copying condition as defined in claim 9 wherein said data on set copying condition and data on the managed copying condition include data representing the service time limit of said film, data representing the initially set value of the standard exposure condition and correction value data for correcting the density value of each image of a test print in correspondence with the dispersion of the density value of the image for each film for setting the copying condition.

12. Film for setting the copying condition as defined in claim 9 wherein said data recording portion comprises a magnetic recording material.

13. Film for setting the copying condition as defined in claim 12 wherein said magnetic recording material comprises a magnetic tape, the magnetic tape being adhered to said film for setting the copying condition.

14. Photosensitive material for managing a processing condition, comprising:
   a photosensitive material; and
   a data recording portion provided on said photosensitive material, and on which condition managing data is recorded, and wherein latent images are recorded on said photosensitive material, said condition managing data and said latent images being used to manage a processing condition of another photosensitive material, and wherein said condition managing data comprises:
   a manufacturing date of said photosensitive material;
   a managing correction value for correcting a seasonal change of a sensitivity of said photosensitive material; and
   a correction value for correcting a density of an image obtained by developing said photosensitive material.

15. Photosensitive material for managing a processing condition, comprising:
   a photosensitive material; and
   a data recording portion provided on said photosensitive material, and on which condition managing data is recorded, and wherein latent images are recorded on said photosensitive material, said condition managing data and said latent images being used to manage a processing condition of another photosensitive material, and wherein said condition managing data comprises:
   a service time limit of said photosensitive material.

16. Photosensitive material for managing a processing condition, comprising:
   a photosensitive material; and
   a data recording portion including a magnetic recording material, said magnetic recording material comprising a magnetic tape adhered to said photosensitive material, and on which is recorded condition managing data, and wherein latent images are recorded on said photosensitive material, said condition managing data and said latent images being used to manage a processing condition of another photosensitive material.

17. Condition managing photosensitive material as defined in claim 16, wherein said condition managing data includes at least a correction value for correcting a density of an image, and wherein said correction value is obtained by development of said condition managing photosensitive material.

18. Condition managing photosensitive material as defined in claim 17, wherein said condition managing data includes at least a standard exposure condition under which said another photosensitive material is printed.

19. Photosensitive material for managing a processing condition, comprising:

a photosensitive reference film, including at least one developed image and having related processing condition managing data stored on a portion of said photosensitive reference film, said photosensitive reference film being used for setting an initial correction value for managing the processing condition; and a photosensitive control strip, including at least one latent image and having related processing condition managing data stored on a portion of said photosensitive control strip, said photosensitive control strip being used for setting a secondary correction value for managing the processing condition.

* * * * *